United States Patent [19]

Blankenbecler

[11] Patent Number: 5,044,737
[45] Date of Patent: Sep. 3, 1991

[54] DOUBLE AXIAL GRADIENT LENS AND PROCESS FOR FABRICATION THEREOF

[75] Inventor: Richard Blankenbecler, Stanford, Calif.

[73] Assignee: Isotec Partners, Limited, San Jose, Calif.

[21] Appl. No.: 379,086

[22] Filed: Jul. 13, 1989

[51] Int. Cl.$^5$ ............................ G02B 3/00; G02B 9/02
[52] U.S. Cl. .................................... 359/653; 359/900
[58] Field of Search ............................................ 350/413

[56] References Cited

U.S. PATENT DOCUMENTS 4,758,071  7/1988  Mclaughlin et al. ................ 350/413

OTHER PUBLICATIONS

Heel, "One Radius Doublets", *Optica Acta*, vol. 2,4/55, pp. 29–35.

Primary Examiner—Scott J. Sugarman
Assistant Examiner—Rebecca D. Gass
Attorney, Agent, or Firm—David W. Collins

[57] ABSTRACT

A monolithic double-axial gradient lens (30) is provided. The lens has an optic axis and three sections perpendicular to the optic axis: a first section (34) having a first graded index of refraction profile and having an outer surface, a middle section (32) having a second graded index of refraction profile, and a third section (36) having a third graded index of refraction profile and having an outer surface. A gradient in the index of refraction is provided in at least the first and third sections. As a result of appropriate selection of gradients, spherical and chromatic aberrations are eliminated or at least reduced, and thermal dependency of optical properties is minimized.

19 Claims, 3 Drawing Sheets

DOUBLE AXIAL GRADIENT LENS AND PROCESS FOR FABRICATION THEREOF

TECHNICAL FIELD

The present application relates to lenses, and, more particularly, to lenses having refractive index gradients formed therein.

BACKGROUND ART

A lens with an axial gradient index profile can cancel the spherical aberrations due to the refraction by the spherical lens surface. The conventional way of achieving this is to have a (essentially) linear dependence of the index in either the upper or the lower spherical cap. This is termed a "single-axial lens".

Such single-axial lenses are used in a variety of applications, for example, in binoculars. Such a configuration permits a reduction in the number of lens elements, and hence the weight of the binoculars.

Such lenses are made by a variety of what might be termed as "micro" processes. Such micro processes include diffusion into a lens blank of a refractive index-altering element of differing atomic number by immersion in a molten salt bath of silver chloride or by coating the lens blank with a thin layer that has a different index of refraction and then heating. Other techniques include implantation of ions into the surface of the lens blank and chemical vapor deposition of a species onto the surface thereof.

All such micro processes suffer from the fact that a substantial period of time is required to produce a desired gradient in the index of refraction and that in any event, such processing results in a gradient near the surface; gradients through relatively thick lens blanks (thickness greater than about fifteen millimeters) are not achievable in reasonable periods of time for commercial applications. Further, the maximum practically achievable index change is on the order of 0.05 for these micro lenses. This limits the use of these gradient index of refraction (GRIN) lenses. The present invention may be used to fabricate short focal length lenses, which cannot be fabricated by the above processes. These can be readily realized by the process of the invention, which can produce a wide range of desired changes in index of refraction.

Recently, so-called "macro" processes have been developed. By macro process is meant the use of bulk glass processing techniques, which can result in considerably thicker glass blanks having a gradient in index of refraction through the entire lens blank. Examples of such processing includes fusing layers of frits or plates together (each layer having a slightly different index of refraction). Typically, the top and bottom members are each of separate composition, with the intermediate members mixtures of the two compositions to give a desired gradient profile.

The macro processes yield lens blanks which have greater thicknesses than obtained by micro processes; dimensions of nearly 50 mm with a gradient along the entire thickness axis are easily fabricated. Further, differences in the index of refraction from one side to the other of 0.1 to 0.25 are routinely achievable, with differences approaching 0.5 attainable.

The macro processes permit fabrication of lens designs not heretofore available to the lens designer using the micro processes. For example, it is desired to correct not only spherical aberrations, but also chromatic aberrations. Further, it is desired to reduce the effects of temperature on the optical properties. The subject matter of the present application is directed to a single lens that has greatly reduced spherical and/or chromatic aberrations as well as greatly reduced dependence of the optical properties on temperature.

In *Applied Optics*, by Leo Levi, Vol. I, John Wiley & Sons, New York, (1968), pp. 490-493 is a description of cemented lens designs in which two (or three) different types of homogeneous glass are ground into the proper shape and then cemented together Of particular interest is the statement with regard to "one-radius doublet" that "[a] careful choice of glasses makes it possible to correct both chromatic and spherical aberrations, despite this severe restriction".

However, such a cemented lens is not structurally strong, nor is there a smooth variation in the index of refraction. This means that there is reflection within the lens, due to the discontinuous index change at the interface.

A lens design of the above type has been discussed by A. C. S. van Heel, "One Radius Doublets" in *Optica Acta*, Vol. 2, pp. 29-35 (1955). The discussion by van Heel points out the advantages of a single lens element that corrects both spherical and chromatic aberrations, but also makes note of the restricted possibilities available to the optical designer using the cemented process.

Accordingly, there remains a need for a monolithic (i.e., unitary) lens permitting correction of at least one of spherical and chromatic aberrations and thermal effects, particularly at short focal lengths.

DISCLOSURE OF INVENTION

In accordance with the invention, a double-axial gradient lens and a process for fabricating the same are provided. As used herein, "double-axial" is defined as a gradient refractive index profile where the refractive index in a lens blank or glass disk has the following profile: At the top surface of the lens blank, the refractive index is a given value. As one traverses the axis normal to the surface toward the middle of the piece, the refractive index decreases to a lower value. In the middle of the piece, the lower refractive index may become constant or may continue to change, perhaps following a new profile. As one continues down the axis toward the bottom of the piece, the refractive index increases again to substantially the same value as that at the top surface of the lens blank or to a different value. Thus, there are a variety of possibilities, with the profile in the blank varying according to the dictates of the lens designer.

The double-axial gradient lens may be thought of as comprising three sections: a top section having a particular index of refraction profile, a middle section having either a substantially constant index of refraction or another profile, and a bottom section having yet another index of refraction profile.

The double-axial lens of the invention comprises only one piece, which means that it is structurally stronger than a lens comprising cemented sections. Further, the index of refraction varies smoothly throughout the lens.

The lens shape may be convex-convex, concave-concave, convex-concave, or concave-convex. The convex-convex and concave-concave geometries can be used to cancel spherical aberrations with appropriate index profiles. The convexconcave or concave-convex geometry can be used to cancel both spherical and chromatic aberrations with appropriate index profiles and Abbe number (i.e., glass composition) distributions. However, since the concave-convex geometry generally requires less change in index of refraction ($\Delta n$), this geometry may be desirably employed.

In its more general configuration, the bottom section may comprise an index profile that is independent of the profile of the top section. Indeed, the middle section may also be provided with a profile to achieve certain purposes.

An axial gradient in the middle section can be used to "fine-tune" the double-axial design. Rays passing vertically through such a gradient would not be bent. Rays propagating at an angle to the vertical would be bent very slightly towards the region of increasing index. This extra degree of freedom in the design parameters can be used to affect the "off-axis" optical properties such as the "coma" aberration.

Judicious selection of materials in forming the gradients permits control over focal length (to make the optical instrument more compact), reduces spherical and chromatic aberrations, and permits control over the thermal expansion of the lens to render it thermally insensitive. While corrector doublets may still be needed in conjunction with the use of the lens of the invention, such doublets need not be as powerful as presently required, but rather can be smaller and thinner.

In the process of the invention, the observation that glasses with higher densities will settle to the bottom of a crucible or mold when mixed with glasses of lower densities during fusion is employed. From the various optical glasses available, it is possible to identify several sets of three glasses which possess similar melting temperatures and coefficients of thermal expansion which can be matched closely and in which the density is such that the glass to be used at the bottom of the mold has the highest density value, the middle glass has a density value less than the lower glass, and the top glass has the smallest density value.

Each of the three glasses is ground into frit and each of the glasses to be used as end glasses are mixed with different percentages of the middle glass to obtain several compositions of successive indices of refraction. These compositions are then formed into homogeneous disks or plates. These disks are then stacked into the proper sequence to produce the desired gradient profile and heated to fuse the disks together to form a solid lens blank. When the glass blank is subsequently polished into, for example, a convex-convex lens shape, the high refractive index glass at either en surface is polished away to expose the lower refractive index glass in the central area of the lens blank to form a double-axial gradient profile, in accordance with the invention.

BEST MODES FOR CARRYING OUT THE INVENTION

Figure 1:
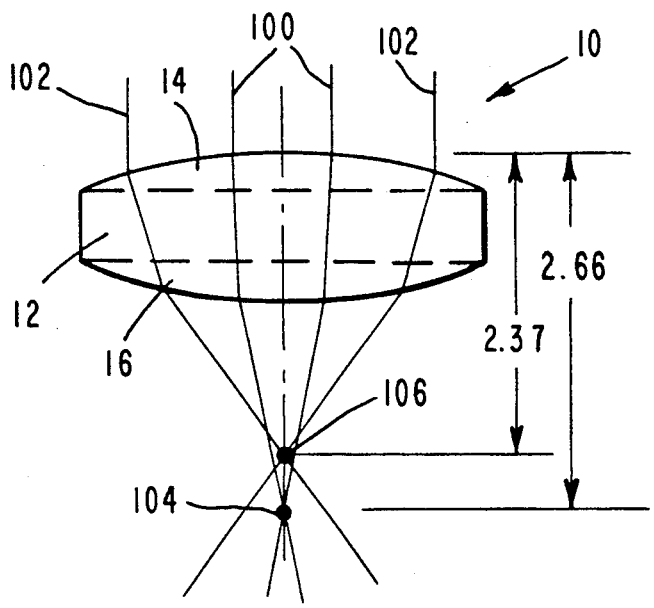
FIG. 1 is a ray tracing through a conventional convex-convex lens having a homogeneous index profile.

The discussion which follows with respect to FIGS. 1 and 2 is to homogeneous (FIG. 1) and single-axial (FIG. 2) lenses assuming fabrication using the plate fusion process described herein, which is disclosed and claimed in Ser. No. 07/266,670, filed Nov. 3, 1988 now U.S. Pat. No. 4,929,065, and assigned to the same assignee as the present application. Use of the micro processes, discussed in Background Art, would result in focal lengths on the order of five to ten times those attained with the macro process.

Referring now to the drawings wherein like reference numerals designate like elements throughout, FIG. 1 depicts ray tracing through a conventional convex-convex lens 10 having a homogeneous index of refraction throughout. This lens is a very short focal length lens design; the requirements that the spherical aberration cancel will in turn place severe demands on the magnitude of the change and the index of refraction. This design could only be made by the process described herein, since the methods of the prior art cannot produce the large change in index required by the short focal length.

Figure 1A:
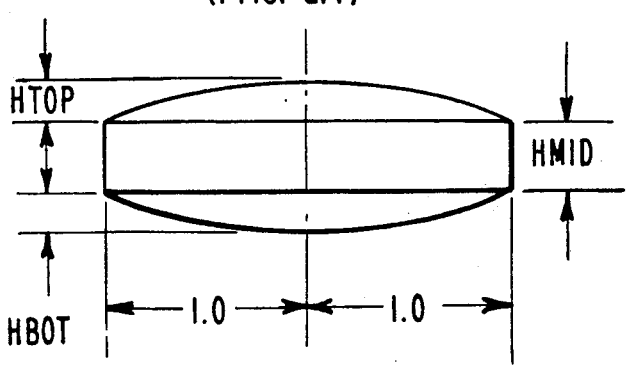
FIG. 1a is a cross-sectional view of a double convex lens, showing the various elements thereof.

The index of refraction is chosen to be 1.700. The lens is double-convex, comprising a center portion 12 having a top cap 14 and a bottom cap 16. In this example, the height of the top cap 14, HTOP, is 0.20 cm, the height of the center part 12, HMID, is 0.60 cm, and the height of the bottom cap 16, HBOT, is 0.20 cm. All dimensions in these examples can be scaled by any arbitrary factor. FIG. 1a illustrates the location of these values for the lenses shown in the Figures.

The rays 100 that strike the lens 10 three-fourths of the way out of the lens, at XTOP=0.75, emerge from the lens at XFIN=0.59 and intersect the vertical axis at a point 104 called Z-CROSS=2.37, which is measured from the top of the lens.

The rays 102 that strike the lens one-fourth of the way out of the lens, at XTOP=0.25, emerge from the lens at XFIN'0.20 and intersect the vertical axis at a point 106 called Z-CROSS=2.66. Thus, a measure of the spherical aberration is the difference between the Z-CROSSings, DELTA(s)=0.29, where the label "s" refers to spherical aberrations.

For an index of 1.80 for the homogeneous lens depicted in FIG. 1, DELTA(s)=0.31.

Figure 2A:
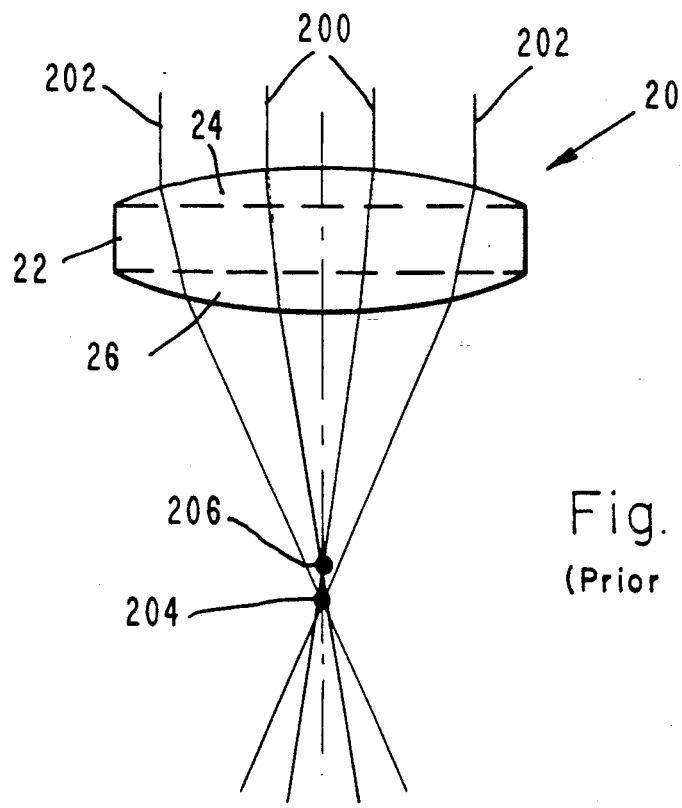
FIG. 2a is a ray tracing through a single-axial lens, with the variable index in the upper cap only.

FIG. 2a depicts ray tracing through a single-axial lens 20, comprising a center section 22 having a homogeneous index of refraction, here, 1.480, and a top cap 24 having a graded index of refraction profile, here, 1.700. That is, the graded index of refraction of the top cap varies from 1.700 at its outer surface to 1.480 at its interface with the center section. The bottom portion 26 has the same index of refraction profile as the center section, or 1.480.

The rays 200 that strike the lens at XTOP=0.75 have Z-CROSS=2.97 at point 204. The rays 202 that strike the lens at XTOP=0.25 have Z-CROSS=2.96 at point 206. Thus, the measure of the spherical aberration is much smaller, DELTA(s)=0.01.

For an index profile of [1.80, 1.53, 1,53] for the single-axial lens 20 of FIG. 2a, DELTA(s)=0.00 and ZCROSS =2.72.

Figure 2B:
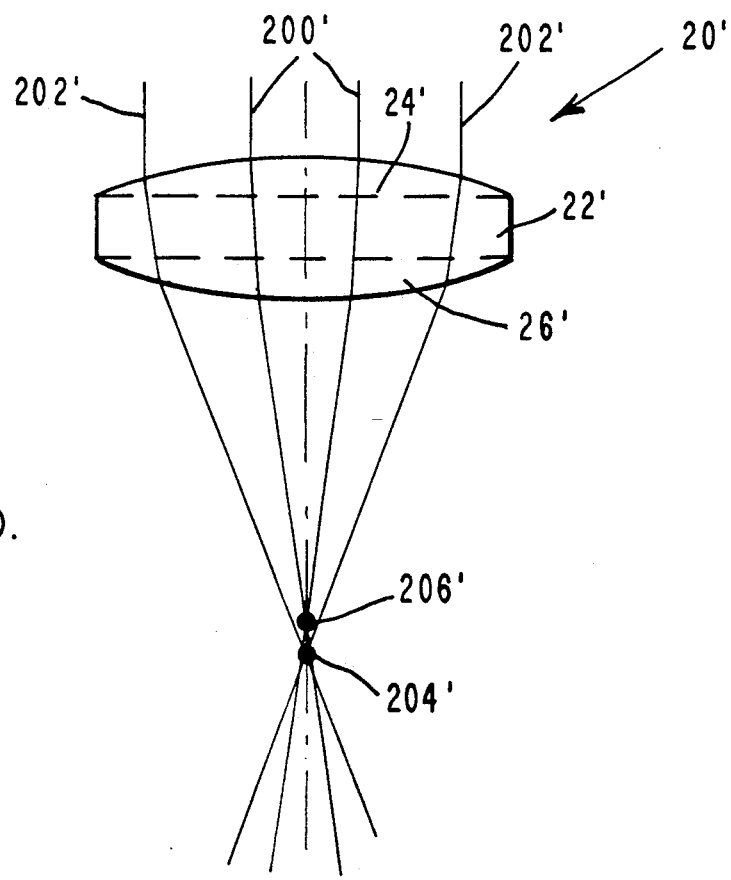
FIG. 2b is a ray tracing through a single-axial lens, with the variable index in the lower cap only.

FIG. 2b depicts ray tracing through a single-axial lens 20,, comprising a section 22' having a homogeneous index of refraction, here, 1.400, and a bottom cap 26, having a graded index of refraction profile, here, 1.700. As above, the graded index of refraction of the bottom cap varies from 1.700 at its outer surface to 1.400 at its interface with the center section. The top portion 24' has the same index of refraction profile as the center section, or 1.400.

The rays 200' that strike the lens at XTOP=0.75 have Z-CROSS=3.26 at point 204, The rays 202' that strike the lens at XTOP=0.25 have Z-CROSS=3.26 at point 206'. Thus, the measure of spherical aberration is very small, DELTA(s)=0.00.

For an index profile of [1.43, 1.43, 1.80] for the single-axial lens 20' of FIG. 2b, DELTA(s)=0.00 and ZCROSS =3.02.

In accordance with the invention, a monolithic double-axial lens 30 is provided. The ray tracing of the lens 30 is depicted in FIG. 3; the lens comprises a middle section 3 provided with two "cap" sections 34 and 36, each cap section having a graded index of refraction profile.

Figure 3:
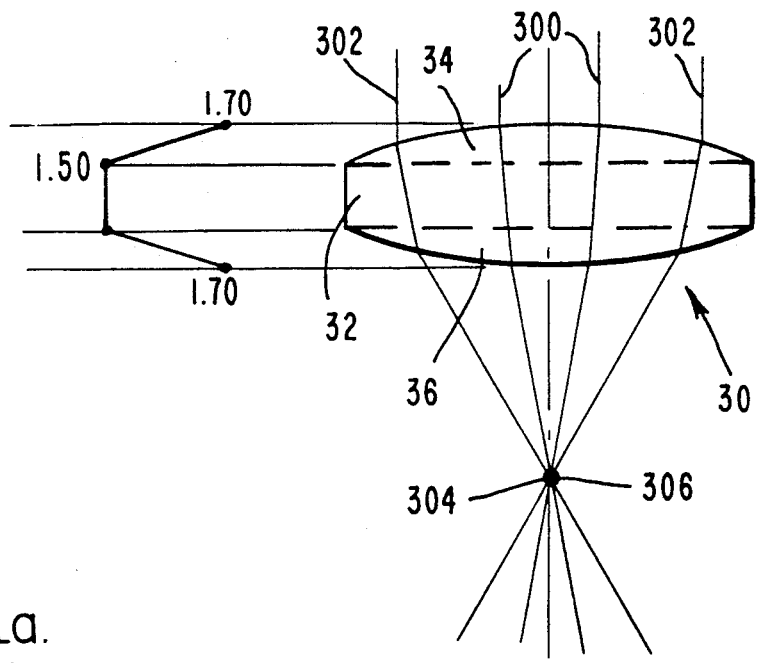
FIG. 3 is a ray tracing through the convex-convex double-axial lens of the invention.

In FIG. 3, the middle section 32 has a homogeneous index of refraction, and the composite profile is shown to the right of the lens 30. However, this section 32 could alternatively have a graded index of refraction in order to fine-tune the design. In the index profile, it will be seen that the index begins at 1.70 at the top of the cap section 34, varies linearly to 1.50, remains at 1.50 across the middle section 32, then varies linearly to 1.70 at the bottom of the cap section 36.

Also, as shown in FIG. 3, the index profile of the bottom cap 36 is the reverse of the profile of the top cap 34. This provides a shorter focal length and hence a more compact optical instrument The spherical aberrations induced by the spherical shape of each cap is canceled within each cap. Thus, the action of such a double-axial lens is much closer to the action of a double parabolic-shaped lens than is the single-axial design.

On the other hand, both the index profile and the glass constituents of the bottom cap 36 can be different and independent of that of the top cap 34. Such a configuration reduces chromatic aberrations due to the use of different glass compositions in the two caps 34, 36. Further, by separately choosing the combination of compositions that control the index and the chromatic sensitivity in the two caps, the designer can adjust the coefficient of thermal expansion of the lens, thereby rendering the lens substantially thermally insensitive.

In this connection, it should be noted that the profiles of the three sections not only are independent, but also may be non-linear, as well as linear, the variation and profile limited only by the imagination of the lens designer.

In general, the independence of the two end caps of the lens allows the designer a larger set of parameters to vary in order to optimize selected optical and physical properties of the lens.

For example, if the designer needed a specific type of glass composition on the top surface of the lens, which had only a restricted index range, then the profile depicted in FIG. 3 could be adjusted to start at 1.60 (instead of 1.70) and vary linearly to 1.46, remain at 1.46, then change linearly back to 1.70 , and get almost the same optical effect.

FIG. 3 illustrates spherical aberration in a double-axial lens with dimensions as before and indices [1.700, 1.500, 1.700]. The variation in the index is in both caps 34, 36. The rays 300 that strike the lens at XTOP=0.75 have Z-CROSS=2.70 at point 304. The rays 302 that strike the lens at XTOP=0.25 have Z-CROSS=2.70 at point 306. Thus, the spherical aberration is very small, with DELTA(s)=0.00.

An index profile of [1.80, 1.53, 1.80] for the double-axial lens of FIG. 3 yields DELTA(s)=0.0 and Z-CROSS =2.72.

Using "thinner" caps in a double-convex lens (larger radii-of-curvature) has the following effect: For a homogeneous lens having an index of 1.70, HTOP=0.125, HMID=0.25, and HBOT=0.125, the Z-CROSSings are 3.09 and 3.30, with DELTA(s)=0.21. For a double-axial lens having indices [1.700, 1.600. 1.700] and the same dimensions, the Z-CROSSings are 3.33 and 3.33, respectively. Thus the spherical aberration is zero, DELTA(s)=0.0. It will be noted that for this lens design, a much smaller change in index is required: DELTA(index)=1.70-1.60=0.10 versus 1.70-1.50=0.20 in the previous geometrical situation.

For this set of parameters with an index profile of [1.80, 1.67, 1.80], a DELTA(s)=0.0 and Z-CROSS=2.97 are obtained.

Figure 4:
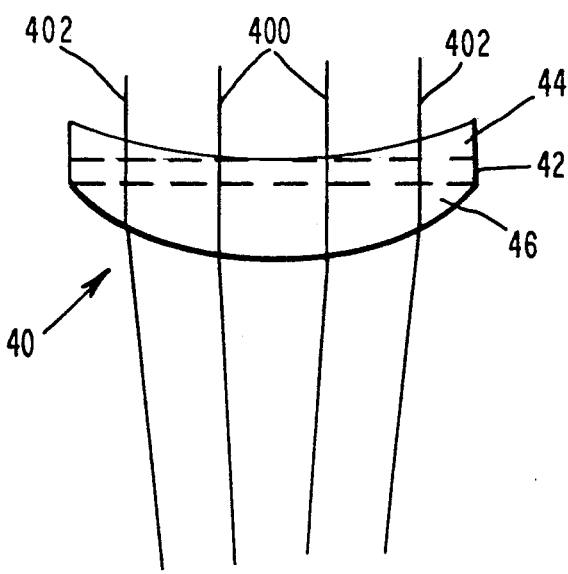
FIG. 4 is a ray tracing through a concave-convex double-axial lens of the invention.

Now consider concave-convex lenses with HTOP=−0.10, HMID=0.10, and HBOT=0.25, shown in FIG. 4. Here, the lens 40 comprises middle section 42, top section (concave) 44, and bottom section 46. The total lens thickness is 0.45. For a homogeneous lens with an index of 1.800, the sample rays have Z-CROSS=4.14 and 4.85, respectively, thereby providing a large spherical aberration, DELTA(s)=0.71. The concave-convex lens is depicted in FIG. 4.

If the index of refraction on the homogeneous lens is increased to 1.810, then the Z-CROSSings are changed to 4.09 and 4.79, respectively, so that DELTA(s)=0.70, essentially unchanged.

By comparing these results, it is seen that if the light changes color (frequency) by an amount that changes the index from 1.80 to 1.81, then the focal lengths, Z-CROSSings, change by 0.05 and 0.06, respectively. This is used below in the examples provided as a standard measure of chromatic aberration.

In the case of a concave-convex double-axial lens having the same dimensions as for the homogeneous lens above and having an index profile of [1.500, 1.600, 1.800], the rays have Z-CROSS=4.28 and 4.29, respectively. The spherical aberration is thus reduced to DELTA(s) =0.01.

If the light changes color or frequency (from red to blue, for example) and the indices increase to [1.55, 1.62, 1.81], which can be accomplished by an appropriate choice of the constituents of the glass, as described in greater detail below, then the Z-CROSSings are 4.27 and 4.28, respectively, so that DELTA(s)=0.01, unchanged.

The point to note here is that the Z-CROSSings are changed only by 0.01. Thus, the chromatic aberrations are reduced by a factor of five or six.

In the foregoing ray tracing analysis, the best possible index change for the homogeneous case was chosen and used to compare with the double-axial lens of the invention. The lower cap 36 in this latter design has a change in its index for red as compared to blue light which is the same as the homogeneous case, namely, 0.56%. The index changes in the middle 32 and top 34 sections are 1.1% and 2.6%, respectively, for these two colors. It is this additional sensitivity in the double-axial lens of the invention that allows the cancellation to occur.

If the lens is designed with a longer focal length (decrease HTOP and HBOT), then the percentage change in the indices required to cancel the chromatic aberrations is also reduced.

From the foregoing analysis, it has been shown that the double-axial index profile can eliminate spherical aberrations by adjusting the index profile to the geometric features of the spherical lens. It has also been shown that by an appropriate choice of the constituents of the glass used to produce the index variation, i.e., utilizing glass with different frequency dependence (different Abbe numbers), the chromatic aberrations can be eliminated as well.

The use of different glass compositions to form the double-axial lens of the invention permits one to make an appropriate choice of glass in the upper and lower spherical caps 34, 36, so that they have different coefficients of thermal expansion. As a result, thermal effects on the focal length can be canceled. This cancellation depends on the fact that the double-axial lens of the invention is not homogeneous, but has a different thermal behavior in the upper cap 34 as compared to the lower cap 36. As the temperature changes, the radii of curvature change, but by different amounts. The effect of the radii of curvature on the focal length can thereby be made to cancel.

The following several examples demonstrate that the spherical and chromatic aberrations can be varied by the designer using the extra degrees of freedom allowed by the double-axial lens of the invention.

Table I below provides additional examples of compensating lens designs that are possible with the doubleaxial lens of the invention. For example, "red" and "blue" are the same design at two different frequencies, red and blue, to study the chromatic behavior.

TABLE I

Example of Lens Design: Low Spherical and Chromatic Aberrations.

| Parameters | Homogeneous | | Double-Axial | |
|---|---|---|---|---|
| HTOP | −0.15 | | | |
| HMID | 0.175 | | | |
| HBOT | 0.25 | | | |
| | red | blue | red | blue |
| VNTOP | 1.80 | 1.81 | 1.550 | 1.585 |
| VNMID | 1.80 | 1.81 | 1.632 | 1.650 |
| VNBOT | 1.80 | 1.81 | 1.800 | 1.810 |
| Z-CROSS, nearest | 5.96 | 5.89 | 5.67 | 5.67 |
| farthest | 6.94 | 6.86 | 5.67 | 5.67 |
| DELTA(s) | 0.98 | 0.97 | 0.0 | 0.0 |
| DELTA(c), nearest | 0.07 | | 0.0 | |
| farthest | 0.08 | | 0.0 | |

Notes:
All radii are the same. 1
VN is the index of refraction
DELTA(s) = spherical aberration
DELTA(c) = chromatic aberration It must be emphasized that the dimensions must be chosen appropriately, in order to avoid problems in one area while correcting problems in another area. For example, the double-axial lens listed in Table II, below, has approximately zero spherical aberration, but about −0.6 chromatic aberration. Here, HMID is too large, since DELTA(c) is <0.

TABLE II

Example of Lens Design: Low Spherical Aberration. Over-corrected Chromatic Aberration.

| Parameters | Homogeneous | | Double-Axial | |
|---|---|---|---|---|
| HTOP | −0.15 | | | |
| HMID | 0.30 | | | |
| HBOT | 0.25 | | | |
| | red | blue | red | blue |
| VNTOP | 1.80 | 1.81 | 1.550 | 1.615 |
| VNMID | 1.80 | 1.81 | 1.630 | 1.660 |
| VNBOT | 1.80 | 1.81 | 1.800 | 1.810 |
| Z-CROSS, nearest | 5.93 | 5.85 | 5.76 | 5.83 |
| farthest | 6.93 | 6.85 | 5.77 | 5.83 |
| DELTA(s) | 1.00 | 1.00 | 0.01 | 0.00 |
| DELTA(c), nearest | 0.08 | | −0.07 | |
| farthest | 0.08 | | −0.06 | |

Notes: All radii are the same. 1

In the following example, HMID is chosen somewhat too small, since DELTA(c) has changed sign from that of Table II, but it is much smaller in magnitude.

TABLE III

EXAMPLE OF LENS DESIGN: LOW SPHERICAL ABERRATION. LOW CHROMATIC ABERRATION.

| Parameters | Homogeneous | | Double-Axial | |
|---|---|---|---|---|
| HTOP | −0.15 | | | |
| HMID | 0.15 | | | |
| HBOT | 0.25 | | | |
| | red | blue | red | blue |
| VNTOP | 1.80 | 1.81 | 1.550 | 1.580 |
| VNMID | 1.80 | 1.81 | 1.644 | 1.660 |
| VNBOT | 1.80 | 1.81 | 1.800 | 1.810 |
| Z-CROSS, nearest | 5.98 | 5.90 | 5.69 | 5.68 |
| farthest | 6.94 | 6.86 | 5.69 | 5.68 |
| DELTA(s) | 0.96 | 0.96 | 0.01 | 0.00 |
| DELTA(c), nearest | 0.08 | | 0.01 | |
| farthest | 0.08 | | 0.01 | |

Notes: All radii are the same. 1

In the following two examples, both the spherical and chromatic aberrations are low and virtually eliminated on axis.

TABLE IV

Example of Lens Design: Low Spherical and Chromatic Aberrations.

| Parameters | Homogeneous | | Double-Axial | |
|---|---|---|---|---|
| HTOP | −0.06 | | | |
| HMID | 0.10 | | | |
| HBOT | 0.12 | | | |
| | red | blue | red | blue |
| VNTOP | 1.80 | 1.81 | 1.710 | 1.755 |
| VNMID | 1.80 | 1.81 | 1.750 | 1.772 |
| VNBOT | 1.80 | 1.81 | 1.800 | 1.810 |
| Z-CROSS, nearest | 10.41 | 10.28 | 10.27 | 10.27 |
| farthest | 10.79 | 10.66 | 10.27 | 10.27 |
| DELTA(s) | 0.38 | 0.38 | 0.00 | 0.00 |
| DELTA(c), nearest | 0.13 | | 0.0 | |
| farthest | 0.13 | | 0.0 | |

Notes: All radii are the same. 1

In the following example, if HMID is reduced to 0.04, then DELTA(s) can be made equal to zero, but DELTA(c) = −0.01. This requires the set [1.80, 1.760, 1.738] and [1.81, 1.781, 1.781].

TABLE V

Example of Lens Design: Low Spherical and Chromatic Aberrations.

| Parameters | Homogeneous | | Double-Axial | |
|---|---|---|---|---|
| HTOP | | | −0.06 | |
| HMID | | | 0.08 | |
| HBOT | | | 0.12 | |
| | red | blue | red | blue |
| VNTOP | 1.80 | 1.81 | 1.715 | 1.760 |
| VNMID | 1.80 | 1.81 | 1.755 | 1.775 |
| VNBOT | 1.80 | 1.81 | 1.800 | 1.810 |
| Z-CROSS, nearest | 10.40 | 10.27 | 10.27 | 10.27 |
| farthest | 10.78 | 10.65 | 10.27 | 10.27 |
| DELTA(s) | 0.38 | 0.38 | 0.00 | 0.00 |
| DELTA(c), nearest | 0.13 | | 0.0 | |
| farthest | 0.13 | | 0.0 | |

Notes: All radii are the same. 1

Preferably, each cap 34, 36 of the invention is equivalent to a parabolic lens, as opposed to a spherical lens, in order to reduce spherical aberrations.

It is well-known that corrector doublets are required in complex lens systems. The lens of the invention and the process for making the same may permit the omission of the corrector doublet, or, if the corrector doublet is still required, it need not be so powerful, and can be smaller and thinner, compared to presently required corrector doublets.

It will be appreciated that the double-axial lens of the invention may be constructed to correct for spherical aberrations only, for chromatic aberrations only, or for thermal effects only. Each of these may be valuable to use in its own appropriate set of applications. Further, the double-axial lens may be used to correct for any two of the foregoing properties, or, indeed, for all three properties. However, it is expected that some compromises may have to be made in the design and/or fabrication of a double-axial lens which corrects for all three properties.

In this connection, it will also be appreciated that the double-axial lens of the invention may be used to reduce spherical and chromatic aberrations in extreme lens designs, such as very short focal length designs.

In the process of the invention, the observation that glasses with higher densities will settle to the bottom of a crucible or mold when mixed with glasses of lower densities during fusion is employed. From the various optical glasses available, it is possible to identify several sets of three glasses which possess similar melting temperatures and coefficients of thermal expansion which can be matched closely and in which the density is such that the glass to be used at the bottom of the mold has the highest density value, the middle glass has a density value less than the lower glass, and the top glass has the smallest density value.

In the following Table VI are two possible sets of glass compositions that could be used to fabricate the index profiles of the double-axial lenses of the invention. The glasses are taken from the Schott Glass Catalogue (Schott Glass Technologies, Inc., Duryea, Pa.), and the type-name refers to the catalog name.

TABLE VI

Examples of Suitable Glass Combinations.

| | Type Name | Index of Refraction | Abbe No. | Density (g/cm³) |
|---|---|---|---|---|
| SET I | FN11 | 1.62096 | 36.2 | 2.66 |
| | BK6 | 1.53113 | 62.2 | 2.69 |
| | BaSF9 | 1.62606 | 39.0 | 3.66 |
| SET II | FN11 | 1.62096 | 36.2 | 2.66 |
| | BK6 | 1.53113 | 62.2 | 2.69 |
| | BaF4 | 1.60532 | 43.9 | 3.50 |

An Abbe number of 30 implies a percentage change in the index of refraction from the red to the blue of approximately 1.4%. An Abbe number of 60 means a change of 0.7%.

Figure 5:
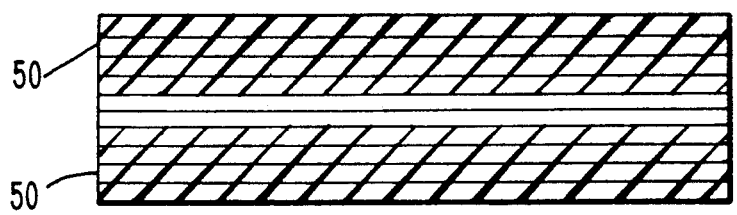
FIG. 5 is a cross-sectional view depicting the stacking of homogeneous plates, each of a different density, as represented by the density of stippling.
Figure 6:
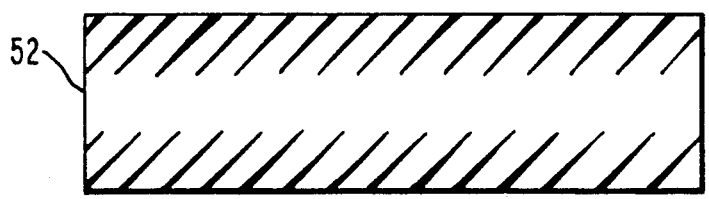
FIG. 6 is a cross-sectional view similar to that of FIG. 5, depicting the solid lens blank that is formed after fusing the plates of FIG. 5 together.
Figure 7:
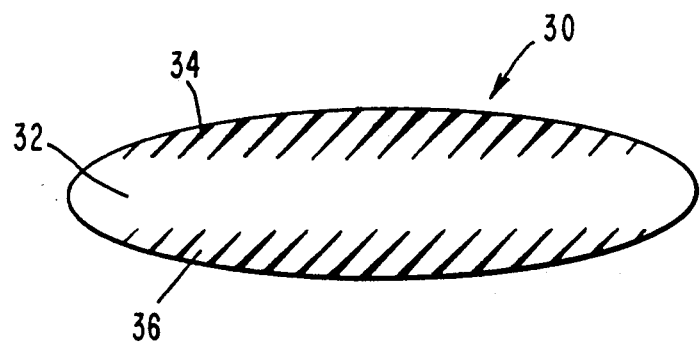
FIG. 7 is a cross-sectional view similar to that of FIG. 6, depicting a finished convex-convex lens after polishing the ends of the lens blank of FIG. 6.

Each of the three glasses is ground into frit and each of the glasses to be used as end glasses are mixed with different percentages of the middle glass to obtain several compositions of successive indices of refraction. These compositions are then formed into homogeneous disks or plates 50. These disks are then stacked into the proper sequence to produce the desired gradient profile, as shown in FIG. 5, and heated to fuse the disks together to form a solid lens blank 52, as shown in FIG. 6. When the glass blank is subsequently polished into, for example, a convex-convex lens shape 30, the high refractive index glass at either end surface is polished away to expose the lower refractive index glass in the central area of the lens blank to form the double-axial gradient profile, as seen in FIG. 7. While a convex-convex lens is shown, it will be apparent to those skilled in the art that other lens shapes, such as those mentioned above, may also be formed by well-known methods.

While plates of several compositions are preferably stacked and fused together, the compositions may alternatively be in the form of frits, which are layered together and fused. If frits are used, care must be taken to remove any gas bubbles introduced during fusion.

The raw lens blank is heated to a temperature somewhat above the highest melting temperature of any of the plates or any frit layer. It is seen that the precise temperature value depends on the glass composition selected.

The temperature must be high enough to ensure mechanical bonding and to allow limited diffusion across the boundary surface between layers However, the heating must *not* induce any convection currents in the glass blank.

The precise time-temperature schedules for both the cooling and the annealing cycles are coupled. The cooling of the initial melt should be gradual so as to *not* induce any strain or distortion in the lens blank. The subsequent annealing schedule depends upon the initial cooling schedule as well as the glass composition chosen. There is a wide latitude available for acceptable schedules.

The index profiles in the three sections do not have to be strictly linear. For example, the profiles may be quadratic or other non-linear shape. Further, their intersection does not require that the slope of the index profile change abruptly. Either of the end sections may have a profile that extends into the middle section. The different sections may be joined via a smoothly varying profile. Finally, a smooth index profile with no sharp discontinuities in either index value or profile slope is generally superior in optical performance.

The foregoing description has set forth a process for fabricating a double-axial lens using glass blanks. However, it will be appreciated by those skilled in the art that plastic (e.g., acrylic) lens blanks having appropriate index of refraction gradients may be used to construct double-axial lenses. Such plastic lenses are also within the ambit of the invention.

Theoretical Treatment of Double-Axial Lens

An approximate treatment of a double-axial lens is now given. This discussion demonstrates the general overall properties of such a lens; however, it should be noted that this treatment is not sufficiently accurate that an actual design can be made from the numerical results. Rather, such an accurate treatment is best done using a highly accurate computer program, as was used to derive the ray tracing studies described above. However, the theoretical treatment herein does provide initial values that can then be refined by a numerical calculation.

Consider the conventional layout of an objectpoint $p_1$ located a distance p on axis to the left of a spherical lens surface labeled $L_1$. The lens has an index of refraction $n_1$ and a radius of curvature of $R_1$. If the region of index $n_1$ extends all the way to the right, then an image is formed at a distance $q_1$ from the intersection of the lens surface and the optical axis. Using conventional Gaussian optics for small angles, Snell's law yields the relation $$1/p + n_1/q_1 = (n_1 - 1)/R_1.$$

Now consider a second lens surface $L_2$ to the right by facing the opposite way, with a radius of curvature of $R_2$ and an index of $n_2$. If it intersects the axis a distance d from the first lens, then the point $q_1$ forms an object point for it with the object distance of $q_1 - d$. An image point is formed further to the right a distance q from $L_2$. The relation between these quantities is found to be as above $$1/q = n_2/(q_1 - d) + (n_2 - 1)/R_2.$$

Using these two equations, a relation between p and q and the parameters that describe the geometry of the lens can be derived. The result is conveniently written as $$n_2/(p+s_1) + n_1*(q+s_2) = F,$$
where $$F = n_1*F_2 + n_2*F_1 - d*F_1*F_2$$
$$s_1 = d*F_2/F$$
$$s_2 = d*F_1/F$$
and
$$F_1 = (n_1 - 1)/R_1$$
$$F_2 = (n_2 - 1)/R_2.$$

The quantities $s_1$ and $s_2$ can be interpreted as "shifts" in the overall object and image distances p and q, due the presence of the "other" lens surface. They are proportional to the center line thickness of the lens d.

NOTE: The bending effects of the axial gradient in the index profile have been neglected in the above analysis. These effects are small in the main features to be discussed below. They are very important, however, in eliminating the spherical aberrations, induced by the spherical lens caps. In fact, in the examples given above, the axial gradient in the index profile was adjusted to cancel the spherical aberrations. Simultaneously, the glass compositions were chosen so that the chromatic dependence of the index on the front and back surfaces was different in such a way that the image point q does not change for the different wavelengths of light.

The focal point is defined as the image distance for an object at an infinite distance from the lens. In this case, the lens is not left/right symmetric. If p is made large, then q becomes the focal length on the right, with a value $$q = -s_2 + n_1/F = (n_1 - d*F_1)/F.$$

Thus, we see that q depends upon $n_1$, $n_2$, $R_1$, $R_2$, and d.

It is now an easy matter to examine how q changes when the indices of refraction, $n_1$ and $n_2$, vary. This is what is needed to study chromatic aberrations, in which the change in color, or wavelength, of light causes the index of refractions of a lens to vary. If both $n_1$ and $n_2$ vary, then it is easy to compute the resultant change in q if the changes, $dn_1$ and $dn_2$, are small (which is the case for chromatic effects).

If $$n_1 > n_1 + dn_1, \text{ and}$$
$$n_2 > n_2 - dn_2.$$

then $$q > q + dq$$

which can be written as $$-dq = D_{21}*dn_1 - D_{22}*dn_2.$$

where $$F*D_{21} = q*[F_2*(1 - d/R_1) - n_2/R_1] - (1 - d/R_1)$$
$$F*D_{22} = q*[F_1*(1 - d/R_2) + n_1/R_2].$$

Note that if the "sensitivity" coefficients $D_{21}$ and $D_{22}$ have opposite signs, then $d_q$ can be made small if the variations in index (which have the same sign) have the correct ratio. This is the effect that is utilized to cancel the chromatic aberrations in the double-axial lens of the invention.

In order to have the D's of opposite sign, one of the lens surfaces has to be convex and the other concave so that $R_1$ and $R_2$ have opposite signs. This is the situation discussed in the previous examples With regard to temperature aberrations, it is known that the optical properties of lenses generally depend upon the temperature. This is troublesome, because the image properties then change as the instrument "warms up". These changes occur as the resultant thermal expansion changes the geometry of the lens. There are two separate reasons for this: (1) as the radius of curvature of the lens changes, so does the focal length, and (2) the change in the density of the glass leads to a shift in the index of refraction.

By using a "compensating" design such as in the above chromatic aberration case, that is, by studying the changes in the image distance q as $R_1$, $R_2$, and the index vary, it is possible to design and fabricate a lens whose optical parameters are essentially independent of the temperature.

INDUSTRIAL APPLICABILITY

The double-axial gradient lens 30 of the invention is expected to find use in a wide variety of high quality optical instruments. Such instruments will have reduced weight, due to the shorter focal length provided by the lens and due to the elimination or size reduction of any corrector doublets The lens of the invention used in such instruments may also be more thermally stable than present lenses, due to appropriate selection of compositions. The resultant optical instruments should be less sensitive to alignment errors in the manufacturing process, and be less prone to developing misalignment problems in the field.

Thus, there is provided a double-axial gradient lens and a process for making the same. Various changes and modifications of an obvious nature will be readily apparent to those skilled in the art, and all such changes and modifications are considered to fall within the scope of the invention, as defined by the appended claims.

What is claimed is:

1. A double-axial gradient lens comprising a monolithic unit having an optic axis, said unit having three sections perpendicular to said optic axis, a first section having a first graded index of refraction profile and having an outer surface, a middle section having a second index of refraction profile, and a third section having a third graded index of refraction profile and having an outer surface, with said middle section between said first and third sections.

2. The lens of claim 1 wherein said middle section has a substantially homogeneous index of refraction profile along said optic axis.

3. The lens of claim 1 comprising three independent compositions, a first composition on said outer surface of said first section, a second composition in the middle of said middle section, and a third composition on said outer surface of said third section, whereby said graded index of refraction profiles in said first section is obtained by a varying composition between said outer surface of said first section and said middle section and in said third section is obtained by a varying composition between said outer surface of said third section and said middle section.

4. The lens of claim 1 wherein said middle section has a graded index of refraction profile along said optic axis.

5. The lens of claim 4 wherein said third profile is opposite and substantially equal to said first profile.

6. A method of fabricating a double-axial gradient lens blank having an optic axis comprising forming three portions, one portion between two other portions, said one portion formed with a graded index of refraction, which varies from a first predetermined value to a second predetermined value, and said two other portions having a graded index of refraction.

7. The method of claim 6 wherein said two other portions are each formed with independent graded index of refraction profiles, one of which varies from a predetermined value at an outer surface to said first predetermined value and the other of which varies from a predetermined value at an outer surface to said second predetermined value.

8. A method of fabricating a double-axial gradient lens blank comprising a monolithic unit having an optic axis, said unit having three sections perpendicular to said optic axis, a first section having a first graded index of refraction profile and having an outer surface, a middle section having a second graded index of refraction profile, and a third section having a third graded index of refraction profile and having an outer surface, with said middle section between said first and third sections, said method comprising (a) selecting three glass end member compositions having compatible melting temperatures and coefficients of thermal expansion, each end member composition having a different density;

(b) preparing plates of each end member composition and of compositions between one pair of end member compositions having the lowest density and the intermediate density and between another pair having the highest density and the intermediate density;

(c) arranging said plates to provide a series of compositions, with the most dense end member composition on the bottom, the intermediate end member composition in the middle, and the least dense end member composition on top;

(d) heating said plates to a temperature and for a time sufficient to fuse them together to provide a monolithic mass having gradients in index of refraction between said top member and said middle member and between said middle member and said bottom member; and (e) cooling and annealing said monolithic mass.

9. A method of fabricating a double-axial gradient lens comprising a monolithic unit having an optic axis, said unit having three sections perpendicular to said optic axis, a first section having a first graded index of refraction profile and having an outer surface, a middle section having a second graded index of refraction profile, and a third section having a third graded index of refraction profile and having an outer surface, with said middle section between said first and third sections, said method comprising (a) selecting three glass end member compositions having similar melting temperatures and coefficients of thermal expansion, each end member composition having a different density;

(b) preparing plates of each end member composition and of compositions between one pair of end member compositions having the lowest density and the intermediate density and between another pair having the highest density and the intermediate density;

(c) arranging said plates to provide a series of compositions, with the most dense end member composition on the bottom, the intermediate end member composition in the middle, and the least dense end member composition on top;

(d) heating said plates to a temperature and for a time sufficient to fuse them together to provide a monolithic mass having gradients in index of refraction between said top member and said middle member and between said middle member and said bottom member;

(e) cooling and annealing said monolithic mass; and (f) grinding an appropriately curved surface in said top and bottom members.

10. The method of claim 9 wherein said appropriately curved surface is spherical.

11. The method of claim 9 wherein said appropriately curved surface is parabolic.

12. A method of decreasing at least one of spherical aberrations, chromatic aberrations, and temperature effects in a lens system comprising replacing at least one lens element therein with a double-axial gradient lens comprising a monolithic unit having an optic axis, said unit having three sections perpendicular to said optic axis, a first section having a first graded index of refraction profile and having an outer surface, a middle section having a second index of refraction profile, and a third section having a third graded index of refraction profile and having an outer surface, with said middle section between said first and third sections.

13. The method of claim 12 wherein said middle section has a substantially homogeneous index of refraction profile along said optic axis.

14. The lens of claim 12 wherein said middle section has a graded index of refraction profile along said optic axis.

15. A method of fabricating a double-axial gradient lens blank having an optic axis comprising forming three portions, one portion between two other portions, said one portion formed with a constant index of refraction, and said two other portions each formed with independent, different graded profiles, each of which vary from a predetermined value at an outer surface to the value of said one portion.

16. A method of fabricating a double-axial gradient lens blank having an optic axis comprising forming three portions, one portion between two other portions, at least said two other portions having a graded index of refraction, said two other portions having glass compositions different from each other.

17. The method of claim 16 wherein said one portion is formed with a constant index of refraction and said two other portions are formed with independent graded index of refraction profiles which vary from a predetermined value at an outer surface to the value of said one portion.

18. The method of claim 16 wherein said one portion is formed with a graded index of refraction, which varies from a first predetermined value to a second predetermined value.

19. The method of claim 18 wherein said two other portions are each formed with independent graded profiles, one of which varies from a predetermined value at an outer surface to said first predetermined value and the other of which varies from a predetermined value at an outer surface to said second predetermined value.

* * * * *